Dec. 14, 1937.  D. H. MONTGOMERY  2,102,183
METALWORKING MACHINE
Filed Nov. 18, 1933   2 Sheets-Sheet 1

INVENTOR
DONALD H. MONTGOMERY
BY
ATTORNEYS.

Dec. 14, 1937.     D. H. MONTGOMERY     2,102,183
METALWORKING MACHINE
Filed Nov. 18, 1933     2 Sheets-Sheet 2

INVENTOR
DONALD H. MONTGOMERY
BY
ATTORNEYS.

Patented Dec. 14, 1937

2,102,183

UNITED STATES PATENT OFFICE 2,102,183

METALWORKING MACHINE

Donald H. Montgomery, Berlin, Conn., assignor, by mesne assignments, to The New Britain Machine Company, New Britain, Conn., a corporation of Connecticut Application November 18, 1933, Serial No. 698,612

4 Claims. (Cl. 29—57)

My invention relates to a metal working machine, and particularly to means for maintaining the same in a relatively cool state.

In modern high speed machines, such as bar machines, copious quantities of cutting oil or other coolant are directed upon the tools and bar stock during cutting operations. In order to prevent the cutting oil from splashing splash guards are usually employed, to substantially box in or at least partially enclose the tools and work where the coolant is directed upon them. Such machines often heat up to an undesirable extent, due to several causes, among others being the heating up of the oil or other coolant during its continued circulation and due to boxing in of the tools and work, thus impairing the free escape of heat or heated air.

It is the principal object of my invention, therefore, to provide means for maintaining a machine of the character indicated in a relatively cool state.

It is a more specific object to provide means for quite effectively withdrawing heat from the cutting oil or other coolant used in the metal working machine.

It is still another specific object to provide means for artificially creating a current of air to withdraw heat and serve to carry away heated air and gases from adjacent the tools and work.

Briefly stated, in a preferred form of the invention, the machine may consist of a frame, together with relatively movable work and tool holders. Coolant, such as cutting oil, is supplied to the tools and work during the cutting operation, and the tools and work are more or less boxed in or enclosed, to prevent undue splashing of the coolant. Chips are allowed to fall and collect to a greater or less degree in a chip pan or other container, which permits drainage or escape of cutting oil. A current of air is directed either by a fan, blower or other means, preferably across the chips, so as to withdraw heat therefrom and preferably through the space adjacent the work and tool holders, so that heat is withdrawn and hot gases adjacent the tools and work will be withdrawn so as to maintain the machine in a relatively cool state.

In the drawings which show, for illustrative purposes only a preferred form of the invention, some parts being more or less schematically illustrated—

Figure 1:
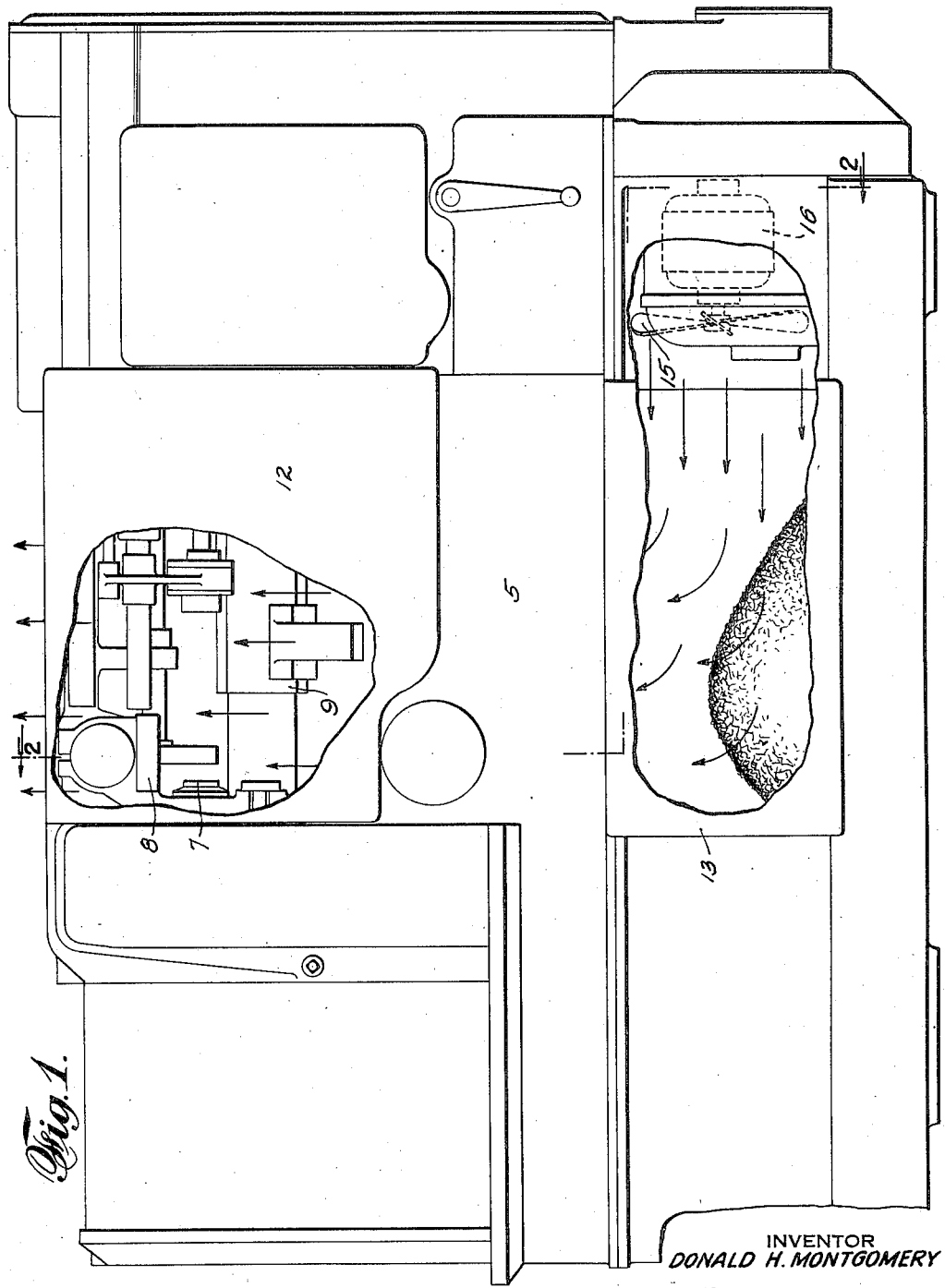
Fig. 1 is a side view of a bar machine of substantially the form disclosed in Gridley et al. application, Serial No. 551,136, filed July 16, 1931, parts being broken away.
Figure 2:
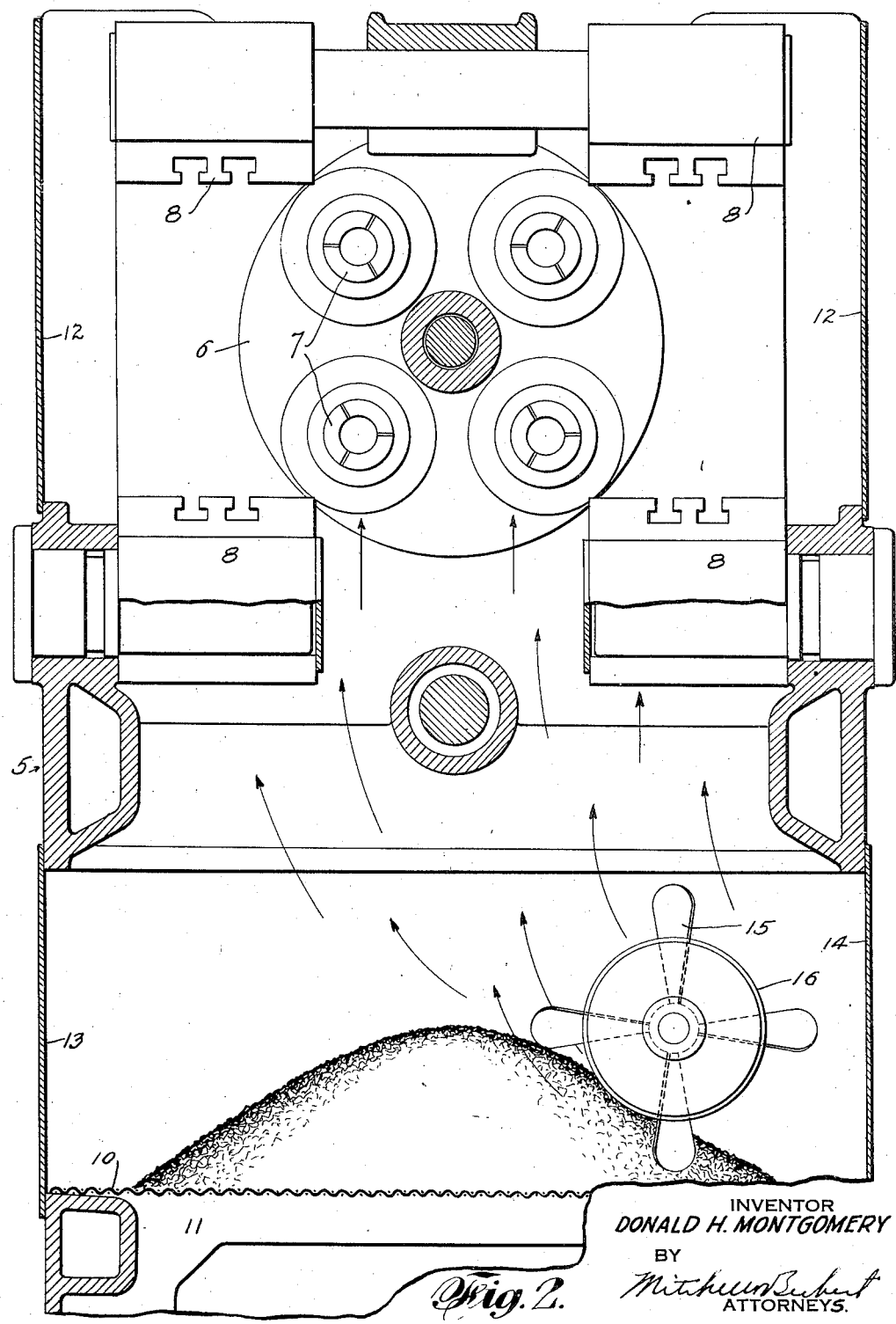
Fig. 2 is a sectional view, taken substantially in the planes of the line 2—2 of Fig. 1.

In said drawings 5 indicates generally the frame of a multiple spindle bar machine. The present machine embodies an indexible spindle carrier 6, carrying rotatable spindles and chucks 7—7. The machine embodies cross slides 8—8 for tools, and a Gridley type of longitudinal tool slide 9 for carrying end working tools. In the present machine as well as in other types of metal working machines coolant, such as cutting oil, is directed onto the tools and work in a manner well known in the art, and no illustration thereof has been made. The chips fall down to the bottom of the frame, where they may be retained upon a screen 10, permitting a drainage of the cutting oil into the base 11, from which it is withdrawn and again circulated in the usual manner.

In order to prevent excess of splashing of cutting oil, removable splash guards in the form of plates 12 may be secured to the front and back of the frame, so as to substantially box in or house the tools and work. Removable guard plates 13—14 may also be secured to the frame to enclose the bottom portion. Chips may be withdrawn either from the side or from the end, as is usual.

In order to prevent the stagnation of heated air in the boxed in space about the roots and work, as well as to cool off the cutting oil, I provide means for directing a current of air past the tools and work, so as to carry away heated air and cool off the tools. In the form shown I have indicated a simple form of fan or blower 15, driven by a small independent motor 16, located in the base of the frame. The air is directed across the chip space and up through the boxed in portion, as will be clear from the arrows indicated in the drawings. Such a current of air passing up through the boxed in space effectively purges that space of heated air and oil vapors, and thus assist in maintaining the machine in a cool state.

It has also been found that chips accumulating in the chip pan are very effective heat radiators. Thus, the current of air directed across the chips serves to effectively withdraw the heat therefrom, so that cutting oil draining down through the chips will not be unduly heated and the cutting oil will thus be maintained in a cool, satisfactory state.

It will thus be seen that I have provided simple means for effectively maintaining a machine of the character indicated in a cool state, and have also provided means for effectively withdrawing heat from heat radiators in the form of chips, so that the cutting oil is not unduly heated in passing down through the chip pile.

While the invention has been described in considerable detail and one embodiment thereof has been disclosed, it is to be understood that various changes and modifications may be made, and the invention may be embodied in various other types of machines, all within the scope of the invention as defined in the appended claims.

I claim:

1. A metal working machine, comprising a frame, relatively movable work and tool holders, a chip container therebeneath, and means for directing a current of air over said chip container and past the space adjacent said work and tool holders.

2. In a machine of the character indicated, a frame, relatively movable work and tool holders, means for catching chips beneath said holders and upon which chips may pile up and upon which cutting oil drops, and means for directing a current of air across the chips for cooling the same.

3. In a machine of the character indicated, a frame, relatively movable work and tool holders, a chip container beneath said holders and having means for permitting drainage of coolant, and means for directing a current of air over an accumulation of chips on said chip container, for the purpose described.

4. In a machine of the character indicated, a frame, relatively movable work and tool holders, means for discharging coolant adjacent said work and tool holders and permitting the same to flow downwardly, and means for directing a current of air upwardly through said downwardly flowing coolant and past said relatively movable work and tool holders.

DONALD H. MONTGOMERY.